United States Patent
Tota et al.

(10) Patent No.: US 11,840,594 B2
(45) Date of Patent: Dec. 12, 2023

(54) POLYMERIZATION CATALYST SYSTEM AND PROCESS TO PRODUCE HIGHLY REACTIVE POLYISOBUTYLENE

(71) Applicant: Indian Oil Corporation Limited, Mumbai (IN)

(72) Inventors: Rajasekhar Tota, Faridabad (IN); Gurmeet Singh, Faridabad (IN); Rashmi Rani, Faridabad (IN); Sujit Mondal, Faridabad (IN); Gurpreet Singh Kapur, Faridabad (IN); Sankara Sri Venkata Ramakumar, Faridabad (IN)

(73) Assignee: INDIAN OIL CORPORATION LIMITED, Mumbai (IN)

( * ) Notice: Subject to any disclaimer, the term of this patent is extended or adjusted under 35 U.S.C. 154(b) by 196 days.

(21) Appl. No.: 17/382,138

(22) Filed: Jul. 21, 2021

(65) Prior Publication Data

US 2022/0025076 A1    Jan. 27, 2022

(30) Foreign Application Priority Data

Jul. 22, 2020    (IN) .............................. 202021031322

(51) Int. Cl.
| | | |
|---|---|---|
| C08F 4/14 | (2006.01) | |
| C08F 10/10 | (2006.01) | |
| C08F 2/01 | (2006.01) | |
| C08F 2/06 | (2006.01) | |
| C08F 2/38 | (2006.01) | |

(52) U.S. Cl.
CPC .................. C08F 4/14 (2013.01); C08F 2/01 (2013.01); C08F 2/06 (2013.01); C08F 2/38 (2013.01); C08F 10/10 (2013.01)

(58) Field of Classification Search
CPC .......... C08F 10/10; C08F 4/14; C08F 110/10
See application file for complete search history.

(56) References Cited

U.S. PATENT DOCUMENTS

| | | | |
|---|---|---|---|
| 4,400,493 A | 8/1983 | Abernathy, Jr. et al. | |
| 5,674,955 A | 10/1997 | Kerr et al. | |
| 5,846,429 A | 12/1998 | Shimizu et al. | |
| 5,962,604 A | 10/1999 | Rath | |
| 6,300,444 B1 | 10/2001 | Tokumoto et al. | |
| 6,683,138 B2 | 1/2004 | Baxter, Jr. et al. | |
| 7,771,442 B2 | 8/2010 | Shriver | |
| 8,637,619 B2 | 1/2014 | Koenig et al. | |
| 9,034,998 B2 | 5/2015 | Faust et al. | |
| 9,156,924 B2 | 10/2015 | Faust et al. | |
| 9,631,038 B2 | 4/2017 | Faust et al. | |
| 10,174,138 B1 | 1/2019 | Faust et al. | |
| 10,829,573 B1 * | 11/2020 | Dimitrov | .............. C08F 110/10 |

OTHER PUBLICATIONS

Vasilenko et al., "Cationic Polymerization of Isobutylene Using AlCl3OBu2 as a Coinitiator: Synthesis of Highly Reactive Polyisobutylene," Macromolecules 2010, 43, 5503-5507. (Year: 2010).*

Shiman, Dmitriy I., "Cationic polymerization of isobutylene catalyzed by iBuAlCl2 in the presence of ethers: Effect of catalyst pre-activation and mixture of two ethers", Polymer, Accepted Jul. 3, 2016.

Mach, H., "Highly Reactive Polyisobutene as a Component of a New Generation of Lubricant and Fuel Additives", Lubrication Science 11-2, Feb. 1999.

Kumar, Rajeev, "Polymerization of Isobutylene by GaCl3 or FeCl3/Ether Complexes in Nonpolar Solvents", Macromolecules, ACS Publications, Received Aug. 21, 2012, Revised Sep. 26, 2012, pp. A-F.

Kostjuk, Sergei V., "Recent progress in the Lewis acid co-initiated cationic polymerization of isobutylene and 1,3-dienes", RSC Adv., 2015, 5, pp. 13125-13144.

Kostjuk, Sergei V., "Cationic Polymerization of Isobutylene at Room Temperature", Journal of Polymer Science, Part A: Polymer Chemistry, 2013, 51, pp. 471-486.

Shiman, Dmitriy I., "Cationic Polymerization of Isobutylene and C4 Mixed Feed Using Complexes of Lewis Acids with Ethers: A Comparative Study", Chinese Journal of Polymer Science, Published Jun. 25, 2019, https://doi.org/10.1007/s10118-019-2290-4.

* cited by examiner

Primary Examiner — Catherine S Branch
(74) Attorney, Agent, or Firm — Workman Nydegger

(57) ABSTRACT

The present invention provides a method for producing highly reactive polyisobutylene by liquid phase polymerization of isobutylene or isobutylene containing feed stock, wherein at least 70 mole % of polymer chains in the polyisobutylene have exo olefin end groups. Further, the present invention provides a catalyst composition for polymerization, comprising of a Lewis acid complexed with at least two Lewis bases selected from sterically hindered ether and linear dialkyl ether; or a Lewis base complexed with at least two Lewis acids selected from aluminium halides mixture. The present invention additionally provides that Lewis acid with Lewis bases mixture or Lewis base with Lewis acids mixture constituting the catalyst show synergistic effect resulting in high isobutylene conversion and production of polyisobutylene having high exo olefin content, while maintaining desired molecular weight range of 250-10000 Dalton.

16 Claims, 1 Drawing Sheet

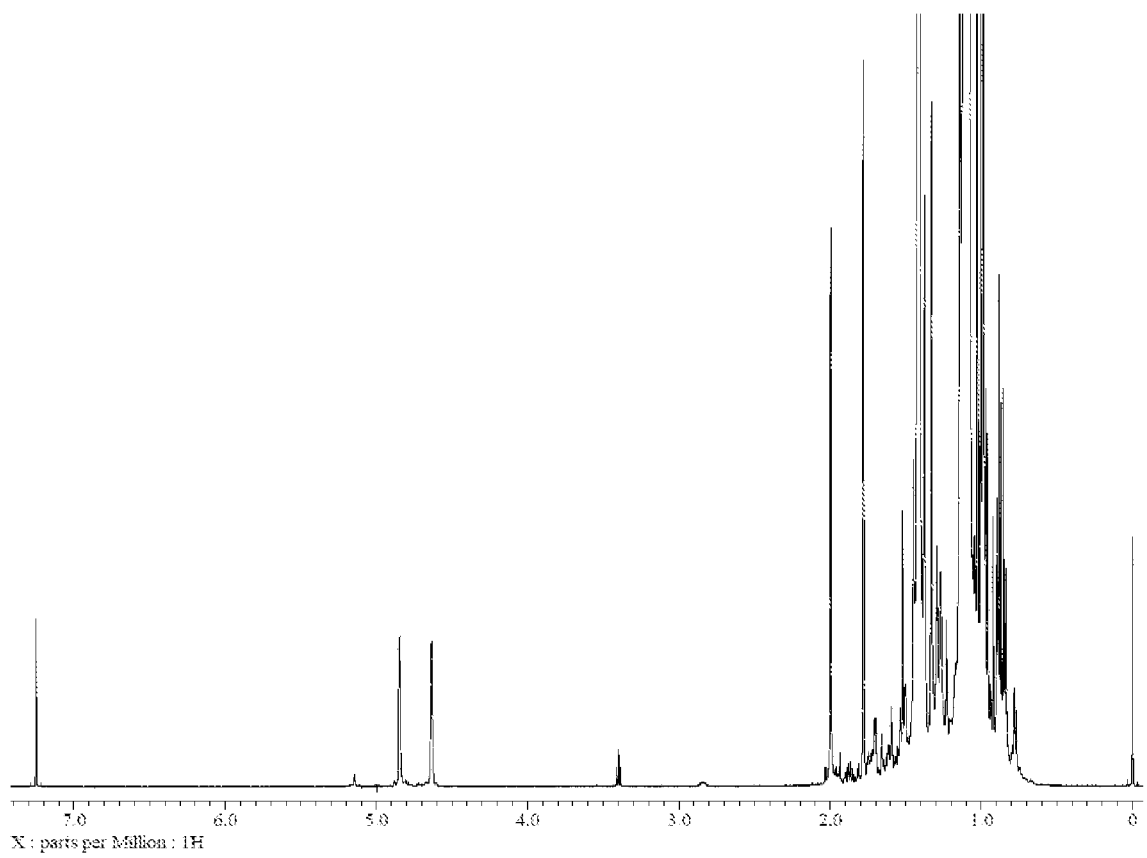

POLYMERIZATION CATALYST SYSTEM AND PROCESS TO PRODUCE HIGHLY REACTIVE POLYISOBUTYLENE

FIELD OF THE PRESENT INVENTION

The present invention relates to a polymerization catalyst system for liquid phase polymerization of isobutylene or an isobutylene containing feed stock for producing polyisobutylene, wherein at least 70 mole % of polymer chains in the polyisobutylene have exo olefin end groups. Further, the present invention relates to a method for producing highly reactive polyisobutylene by liquid phase polymerization.

BACKGROUND OF THE PRESENT INVENTION

Catalyst systems for cationic polymerization of isobutylene (IB) or IB containing feed stock (e.g. Raffinate 1) that can produce highly reactive polyisobutylene (HR PIB) having Mn (number average molecular weight) in the range of 500-5000 Dalton with at least 70 mole % reactive vinylidene at the terminus are of high commercial value. A prime utility of the HR PIB discussed herein is as a precursor material in the preparation of motor oil and fuel auxiliaries (e. g. polyisobutylene succinimide, PIBSI). In comparison to the internal olefin ends (tri and tetra substituted) containing conventional PIBs, PIB with terminal vinylidene functionality (exo group) is highly reactive toward maleic anhydride in a thermal "ene" reaction to produce polyisobutylene succinic anhydride (PIBSA) and subsequently PIBSI ashless dispersants (Lubr. Sci., 1999, 11-20, 175).

The widely used traditional process to prepare HR PIB is based on boron trifluoride ($BF_3$) catalyst system. U.S. Pat. No. 6,683,138 describes a method for preparing HRPIB using $BF_3$ as the catalyst. This process utilizes an alcohol or ether nucleophile at low temperatures below −30° C. The requirement of low temperatures and highly purified feed makes the process more expensive. Moreover, $BF_3$ is not easy to handle and is detrimental to the reactor. A continuing problem in the industry is the persistence of fluorides in the product, especially organic fluorides. Fluorides cause several problems in the plant and in the product. A particular drawback of this process is the difficulty in the separation of small amounts of fluorine based by-products (U.S. Pat. Nos. 6,300,444; 5,674,955; and 5,846,429), which causes problems in downstream functionalization reactors due to the release of HF under the thermal stress of operational condition (U.S. Pat. No. 5,962,604).

Recently, catalysts based on Lewis acid and Lewis base complexes have been found for polymerization of IB in polar or non-polar solvents at temperatures of −30° C. to +50° C. to provide high yields of HR PIB (J. Polym. Sci., Part A: Polym. Chem., 2013, 51, 471 and RSC Adv., 2015, 5, 13125). In the above developments, suitable Lewis bases have been oxygen containing nucleophiles such as ethers, alcohols, ketones, aldehydes and esters, and sulfur-containing nucleophiles such as thioethers and thioketones. Lewis acid catalysts useful in the above developed catalyst systems can be metal halide or alkyl metal halide, wherein metal atom is selected from Al, Fe, Ga, Hf, Zr and W (U.S. Pat. Nos. 9,034,998; 9,156,924; 9,631,038; 7,771,442; and 10,174,138). However, commercially conventional PIBs are typically produced by polymerizing C4 fractions cationically with a low cost, $AlCl_3$ based catalysis method (U.S. Pat. No. 4,400,493). The exploration of the potential operation of such catalyst systems and low-cost production has led towards use of aluminium halide based system for synthesis of HR PIB by polymerization of IB or IB containing feed stock, $C_4$ feed.

U.S. Pat. No. 8,637,619 describes a process for preparing HR PIB using $AlCl_3$ based complex catalyst in combination with a range of initiators or adventitious water to initiate the polymerization of IB in chlorinated polar solvent (dichloromethane/hexane 80/20 v/v). Moreover, the polymerization system was found to provide high yields of HR PIB using $AlCl_3 \cdot OBu_2$. However, the polymerization requires the use of chlorinated polar solvents, such as dichloromethane, which is undesirable from commercial, health, safety, and environmental point of view. Furthermore, the same catalyst which works in a polar solvent, does not work in a non-polar solvent such as hexanes (U.S. Pat. No. 9,034,998; and Macromolecules 2012, 45, 3318-332). Getting high IB conversions and high exo content is desirable in a non-polar solvent with $AlCl_3$. Thus, there remains an open challenge for a robust and economical process for the production of HR PIB using $AlCl_3$ based catalyst system in a non-polar solvent.

U.S. Pat. No. 9,156,924B2 relates to method for producing highly reactive olefin polymers wherein at least 50 mol. % of the polymer chains have terminal double bonds, and a novel polymerization initiating system for accomplishing same. The patent also discloses Lewis acid catalyst complexed with an oxygen and/or sulfur-containing Lewis base, in a substantially or completely apolar solvent; and Lewis acid of the formula MR"mYn, wherein M is a metal selected from Al, Fe, Ga, Hf, Zr and W; R" is a hydrocarbyl group; Y is halogen; m is 0 or an integer of 1 to 5; and n is an integer of 1 to 6, with the proviso that m+n is equal to the valency of metal M; said Lewis base is dihydrocarbyl ether; wherein a single Lewis acid is combined with a single ether. The catalyst employed is $FeCl_3$ and one or each of the hydrocarbyl groups of the dihydrocarbyl ether Lewis base is substituted with an electron-withdrawing group, particularly a halogen atom, preferably chlorine.

Shiman et al. (Chinese Journal of Polymer Science volume 37, pages 891-897(2019)) relates to a cationic polymerization of C4 mixed feed and isobutylene co-initiated by $AlCl_3 \times OiPr_2$, $iBuAlCl_2 \times nOiPr_2$, and [emim]Cl—$FeCl_3 \times nOiPr_2$ ([emim]Cl:1-ethyl-3-methylimidazolium chloride). The article further relates to mixtures of ethers of different basicity and steric structures. The catalyst employed in this article is Aluminoxane and requires pre-activation. Further, the article refers to the use of a single Lewis acid.

Shiman et al. (Polymer, Volume 99, 2 Sep. 2016, Pages 633-641) describes a cationic polymerization of C4 mixed feed and isobutylene co-initiated by $AlCl_3 \times OiPr_2$, $iBuAlCl_2 \times nOiPr_2$, and [emim]Cl—$FeCl_3 \times nOiPr_2$ ([emim] Cl:1-ethyl-3-methylimidazolium chloride). Article further relates to mixtures of ethers of different basicity and steric structures and such an ether mixture affords low PDI. The article discloses that the optimal ration between the ether mixture and Lewis acid is about 0.5:1, wherein single Lewis acid is used in the process.

The widely used traditional process to prepare HR PIB is based on boron trifluoride catalyst system. The major drawback of this process is the critical low polymerization temperature, of lower than −30° C. and highly purified feed, which makes the process more expensive. Further, usage of BF3 catalyst system produces fluorine based byproducts that get converted to highly corrosive hydrogen fluoride under thermal stress. This necessitates for an improved method of polymerization of isobutylenes without using toxic and expensive reagents as well as overcoming usage of chlorinated solvent as reaction media as well as non-chlorinated ethers as Lewis base of the catalyst system employed in a polymerization reaction.

SUMMARY OF THE PRESENT INVENTION

The present invention interestingly reveals that a liquid phase polymerization method for preparation of HR PIB by cationic polymerization of IB, or an IB containing feed stock using $AlCl_3$ or alkyl $AlCl_2$ complexed with mixture of ethers (sterically hindered ether and linear dialkyl ether together) as the catalyst and in the presence or absence of alkyl halide initiator, in a non-polar solvent, gives a product having exo olefin end groups greater than 70 mole % and high IB conversion with desired molecular weight of 250-10000 Dalton, particularly 500-5000 Dalton.

Similar outcome was also found with mixed Lewis acids for the above polymerization. $AlCl_3$ and $RxAlCl_{(3-x)}$ with $x \geq 1$ in combination with sterically hindered ether ([Lewis acids]:[sterically hindered ether]=1:1) result in high IB conversion and give rise to a product having high exo olefin end groups, while maintaining the desired molecular weight.

Accordingly, the present invention provides a polymerization catalyst system for liquid phase polymerization of isobutylene or an isobutylene containing feed stock for producing highly reactive polyisobutylene, the catalyst system comprising:
one or more Lewis acids,
one or more Lewis bases, and
optionally one or more initiators,
wherein the catalyst system is a complex of a Lewis acid with a mixture of Lewis bases, or a complex of a Lewis base with a mixture of Lewis acids; and
wherein the polyisobutylene comprises homo or copolymers of isobutylene with at least 70 mole % of polymer chains in the polyisobutylene having exo olefin end groups.

Further, the present invention provides a process for preparing highly reactive polyisobutylene by liquid phase polymerization of isobutylene or an isobutylene containing feed stock using the disclosed polymerization catalyst system, the process comprising:
a) adding a non-polar solvent at a temperature ranging from −20 to 25° C. in a jacketed polymerization reactor equipped with a condenser operating at a temperature ranging from −20 to 10° C. under nitrogen atmosphere,
b) adding isobutylene or an isobutylene containing feed stock to the polymerization reactor containing the non-polar solvent,
c) adding the polymerization catalyst system at a temperature ranging from −20° C. to 20° C. to the polymerization reactor, and
d) terminating polymerization reaction after 1 hour by addition of a polymerization quencher and obtaining the highly reactive polyisobutylene,
wherein polymer chains in the polyisobutylene comprises exo olefin end groups in an amount of is greater than 75 mole % and molecular weight of the polyisobutylene ranges from 500 to 5000 Dalton.

OBJECTIVES OF THE PRESENT INVENTION

A primary objective of the invention is to provide a novel and feasible process for producing HR PIB in non-polar solvents using an aluminium halide based catalyst system.

A further objective of the present invention is to provide a process for high conversion of IB or IB containing feed stock to HR PIB under ambient reaction conditions.

A further object of this invention is to produce HR PIB by polymerization of IB or IB containing feed stock in the presence of a catalyst system which is a mixture of 1) Lewis acids mixture (e. g. $AlX_3$ and alkyl $AlX_2$); and 2) sterically hindered ether.

A further object of this invention is to produce HRPIB by polymerization of IB or IB containing feed stock in the presence of a catalyst system which is a mixture of 1) Lewis acid; and 2) a mixture ethers.

BRIEF DESCRIPTION OF THE DRAWING OF THE PRESENT INVENTION

FIGURE represents the 1H NMR spectrum of HRPIB prepared by the process of the present disclosure.

DETAILED DESCRIPTION OF THE PRESENT INVENTION

Those skilled in the art will be aware that the present disclosure is subject to variations and modifications other than those specifically described. It is to be understood that the present disclosure includes all such variations and modifications. The disclosure also includes all such steps of the process, features of the product, referred to or indicated in this specification, individually or collectively, and any and all combinations of any or more of such steps or features. The present disclosure is not to be limited in scope by the specific embodiments described herein, which are intended for the purposes of exemplification only. Functionally-equivalent products and methods are clearly within the scope of the disclosure, as described herein.

The present invention provides a polymerization catalyst system for liquid phase polymerization of isobutylene or an isobutylene containing feed stock for producing highly reactive polyisobutylene, the catalyst system comprising:
one or more Lewis acids,
one or more Lewis bases, and
optionally one or more initiators,
wherein the catalyst system is a complex of a Lewis acid with a mixture of Lewis bases, or a complex of a Lewis base with a mixture of Lewis acids;
wherein the polyisobutylene comprises homo or copolymers of isobutylene with at least 70 mole % of polymer chains in the polyisobutylene having exo olefin end groups. Thus, the present invention provides a catalyst of a catalyst-initiator system which comprises a Lewis acid.

In an embodiment, the Lewis acid is:

$MR_mX_n$ (Formula I)

wherein
M is selected from a group consisting of Al, Ga, Zr, W, Fe, and Hf,
R is an alkyl group having 1 to 12 carbon atoms,
X is a halogen, wherein X is selected from F, Cl, or Br,
m is in the range of 0 to 5,
n is an integer in the range of 1 to 6, and
wherein m+n is equal to the valency of M (e. g. 3 for Al);
wherein the catalyst system comprises one Lewis acid or a mixture of Lewis acids of Formula I.

In a further embodiment, M is Al, Ga, or Fe, X is Cl or Br, R is an alkyl group having 1 to 8 carbon atoms, m ranges from 0 to 3, and n ranges from 1 to 4. In a preferred embodiment, M is Al.

In another embodiment, the Lewis acid is selected from $AlX_3$, alkyl $AlX_2$, or a mixture of $AlX_3$, alkyl $AlX_2$ or a mixture of $AlX_3$ and alkyl $AlX_2$, wherein X is Cl or Br and the alkyl group has 1 to 8 carbon atoms. These compounds have been found to be particularly useful as Lewis acids for preparing complex with Lewis base.

In another embodiment, the present invention provides that X is Cl, wherein the Lewis Acid is selected from $AlCl_3$ or ethyl aluminum dichloride, or a mixture of $AlCl_3$ and or ethyl aluminum dichloride.

The Lewis base or nucleophile or complexing agent is any compound containing a lone pair of electrons. In one embodiment, the Lewis base is selected from an ether, an alcohol, an amine, an ester, and a mixture thereof.

In another embodiment, the Lewis base is selected from dihydrocarbyl ether, wherein each hydrocarbyl group is independently selected from $C_1$ to $C_8$ hydrocarbyl. In a preferred embodiment, the hydrocarbyl group of the ether is selected from branched alkyl group, linear dialkyl group, sterically hindered alkyl group, or cyclic group.

In an embodiment, the Lewis base is selected from a sterically hindered ether, linear dialkyl ether, and a mixture of sterically hindered ether and linear dialkyl ether.

In an embodiment, the ether is selected from group consisting of methyl ether, ethyl ether, n-propyl ether, n-butyl ether, n-pentyl ether, n-hexyl ether, n-heptyl ether, n-octyl ether, sec-butyl ether, isopropyl ether, isobutyl ether, (2-ethylhexyl) ether, methyl n-butyl ether, methyl sec-butyl ether, methyl n-hexyl ether, methyl n-octyl ether, ethyl n-hexyl ether, ethyl n-octyl ether, ethyl 2-ethylhexyl ether, n-butyl n-octyl ether, n-butyl 2-ethylhexyl ether, ethyl n-butyl ether, ethyl sec-butyl ether, ethyl isobutyl ether, n-propyl-n-butyl ether, n-propyl sec-butyl ether, n-propyl isobutyl ether, n-propyl tert-butyl ether, isopropyl n-butyl ether, methyl isobutyl ether, methyl tert-butyl ether, isopropyl sec-butyl ether, isopropyl isobutyl ether, iso propyl tert-butyl ether, dicyclohexyl ether, diisopropyl ether, dibutyl ether, diphenyl ether, ditolyl ether, dibenzyl ether, tetrahydrofuran, tetrahydropyran, 1,2-dioxane, 1,3-dioxane and 1,4-dioxane. Among the above-mentioned ethers, sterically hindered ether, linear dialkyl ether or a mixture of sterically hindered and linear dialkyl ethers have been found to be particularly useful as Lewis bases for preparing complex with Lewis acid.

The hydrocarbyl groups (one or both) of the branched ether, linear dialkyl ether, sterically hindered ether, and cyclic ether are optionally substituted with an electron-donating group or electron-withdrawing group. The catalyst of the present invention is $AlCl_3$, EADC or a mixture thereof together with nucleophiles, sometimes referred to as Lewis bases or complexing agents.

In one embodiment, the catalyst system comprises sterically hindered ether, linear dialkyl ether, and $AlCl_3$, wherein during polymerization reaction the catalyst is present in an amount ranging from 0.005-0.01 M. In yet another embodiment, the mole ratio of the sterically hindered ether, linear dialkyl ether, and $AlCl_3$ is in the range of 0.25-0.75:0.25-0.75:1.

In a preferred embodiment, the sterically hindered ether is diisopropyl ether and the linear dialkyl ether is dibutyl ether.

In another embodiment, the catalyst comprises:
 a Lewis acid selected from $AlCl_3$, or ethyl aluminum dichloride (EADC), or and a mixture of $AlCl_3$ and ethyl aluminum dichloride; and
 a Lewis base mixture.

In a preferred embodiment, the Lewis base mixture is a mixture of sterically hindered ether and linear dialkyl ether.

In another embodiment, the molar ratio of $AlCl_3$ or ethylaluminum dichloride (EADC) or a mixture of $AlCl_3$ and ethyl aluminum dichloride to complexing agent or Lewis bases mixture or nucleophiles mixture or ethers mixture in the catalyst composition is generally in the range of 1:0.5 to 1:4, preferably from about 1:0.75 to about 1:1.5, more preferably from about 1:1 to about 1:1.1. In a preferred embodiment, the molar ratio is 1:1.

In a preferred embodiment, molar ratio of $AlCl_3$, ethyl-aluminum dichloride (EADC) and the Lewis base mixture is in the range of 0.25-0.75:0.25-0.75:0.5-1.5

Typically, the Lewis acid catalyst together with nucleophile or Lewis base or complexing agent is dosed in a single dose or continuously or in a pulsed manner in the polymerization reactor. The catalyst system employed is typically passed into the polymerization reactor in the form of a slurry or completely dissolved in a solvent, or as a solid.

The invention is directed to a chain transfer cationic polymerization of IB or a C4 feed containing IB and other C4 olefins in a non-polar medium at a temperature in the range of −20° C. to +20° C., initiated using Lewis acid complexes comprising certain mixtures of nucleophiles. This polymerization of IB provides high yields of HR PIB and high IB conversion.

In another embodiment, the initiator of the present invention is selected from hydrochloric acid, water, and a compound of the formula ROH or RX, wherein R is a hydrocarbyl group capable of forming a stable carbonation, for example, benzylic or tertiary carbonation. In one preferred embodiment of the invention, the initiator is tert-butyl chloride. In another preferred embodiment of the invention, the initiator is adventitious moisture. In the present invention, the moisture works as initiator and there is no need to add any initiator separately. Because of this advantage, the moisture pre-existing in the polymerization reaction is the adventitious moisture. Undried reaction solvent like hexane, catalyst components like ethers and monomer feed like isobutylene/C4 obviously consist of certain ppm level of moisture. Apparently, required active cationic species for the polymerization are generated only from the moisture in the presence of $AlCl_3$·ether complex. On the contrary, if the cationic polymerization is conducted in dry conditions, there could be requirement of some external active species generators/initiators namely, alcohols, alkyl halides, esters, etc.

Further, the present invention provides a process for preparing highly reactive polyisobutylene by liquid phase polymerization of isobutylene or an isobutylene containing feed stock using the disclosed polymerization catalyst system, the process comprising:
 a) adding a non-polar solvent at a temperature ranging from −20 to 25° C. in a jacketed polymerization reactor equipped with a condenser operating at a temperature ranging from −20 to 10° C. under nitrogen atmosphere,
 b) adding isobutylene or an isobutylene containing feed stock to the polymerization reactor containing the non-polar solvent,
 c) adding the polymerization catalyst system at a temperature ranging from −20° C. to 20° C. to the polymerization reactor, and d) terminating polymerization reaction after 1 hour by addition of a polymerization quencher and obtaining the highly reactive polyisobutylene,
wherein polymer chains in the polyisobutylene comprises exo olefin end groups in an amount of is greater than 70 mole % and molecular weight of the polyisobutylene ranges from 250 to 10000 Dalton, preferably 500 to 5000 Dalton.

In yet another embodiment, the non-polar solvent is selected from C4 feed, pentanes, hexanes, heptanes, octanes, decanes, paraffins, toluene, or xylenes.

After the desired parameters of the HRPIB are attained in the polymerization of IB or IB containing feed stock, the polymer product is quenched with a medium that quenches the polymerization catalyst and stops the polymerization. In an embodiment, the polymerization quencher is selected from alcohols, amines, caustics, and water. By washing with caustic, traces of the residual quantities of catalyst are removed. In a preferred embodiment, the polymerization quencher is selected from methanol, water, sodium hydroxide solution, ammonia solution, etc.

The IB or IB containing feed stock polymerization in a continuous process under steady state conditions is of industrial interest. The conventional continuous process reactors, such as continuous stirred tank reactors, tube reactors, or tube-bundle reactors, are used for feed stock polymerization. Obviously, the inlet feed rate is equal to the rate of the polymerization discharge/outlet after the steady-state equilibrium has been established in the polymerization reactor.

Abbreviations

IB=Isobutylene
HRPIB=Highly reactive polyisobutylene
$AlCl_3$=Aluminum trichloride
EADC=Ethylaluminum dichloride
i-$Pr_2O$=Diisopropyl ether
$Bu_2O$=Dibutyl ether
NMR=Nuclear magnetic resonance Technical advantages of the present invention:
1. Present invention overcomes challenges of cost and corrosive byproducts formation associated with traditional commercial catalyst.
2. Present invention provides efficient, highly active, and low cost $AlCl_3$ based catalyst system for HRPIB preparation in completely non-polar solvent medium.
3. Combination of different catalyst components such as Lewis acids mixture or Lewis bases mixture is able solve the prior art disadvantages, including conversion, exo content, catalyst performance or activity in non-polar solvents, etc.
4. The catalyst system of the present invention works at 0-10° C., whereas a traditional commercial catalyst requires temperatures as low as −30° C.
5. The invention enables high conversions and production of polyisobutylene having high exo olefin content of greater than 75%.
6. Polyisobutylene with targeted molecular weight of 250-10000 Dalton, particularly 500-5000 Dalton are achieved by controlling polymerization parameters.
7. The process is environmentally friendly with no usage of dangerous chemicals like chlorinated solvents/chlorinated ethers.

EXAMPLES

The disclosure will now be illustrated with working examples, which is intended to illustrate the working of disclosure and not intended to take restrictively to imply any limitations on the scope of the present disclosure. Unless defined otherwise, all technical and scientific terms used herein have the same meaning as commonly understood to one of ordinary skill in the art to which this disclosure belongs. Although methods and materials similar or equivalent to those described herein can be used in the practice of the disclosed methods, the exemplary methods, devices and materials are described herein. It is to be understood that this disclosure is not limited to particular methods, and experimental conditions described, as such methods and conditions may vary.

Example 1

Polymerizations were performed in a jacketed reactor equipped with condenser operating at −10° C. under nitrogen atmosphere. In a typical example of experiment, 800 mL of hexanes was placed in the reactor at 0° C. 200 mL of IB (4 M) was condensed and added to the polymerization reactor containing hexanes. Then, polymerization was started under stirring by the addition of the prepared $AlCl_3$•ethers complex, 0.01 M (wherein, [$AlCl_3$]=0.01 M, [i-$Pr_2O$]=0.005 M, and [$Bu_2O$]=0.005 M) to the reactors at 0° C. After 1 hour of the polymerization time, polymerization was terminated by addition of methanol. 98% polymerization yield observed. The product had Mn, NMR=1500 Dalton, and exo olefin content 78%.

The polymerization yields were determined gravimetrically. The distribution of different olefin end-groups and molecular weight (Mn, NMR) were determined by 1H NMR.

Example 2

Polymerizations were performed in a jacketed reactor equipped with condenser operating at −10° C. under nitrogen atmosphere. In a typical example of experiment, 800 mL of hexanes was placed in the reactor at 0° C. 200 mL of IB (4 M) was condensed and added to the polymerization reactor containing hexanes. Then, polymerization was started under stirring by the addition of the prepared Lewis acids•i-$Pr_2O$ complex, 0.01 M (wherein, [$AlCl_3$]=0.005 M, [EADC]=0.005 M, and [i-$Pr_2O$]=0.01 M) to the reactors at 0° C. After 1 hour of the polymerization time, polymerization was terminated by addition of NaOH solution. 98% polymerization yield observed. The product had Mn, NMR=1500 Dalton, and exo olefin content 80%.

TABLE 1

Polymerization of IB using [Lewis acid · Lewis base] = 0.005 to 0.01 M in dry hexanes at 0° C. with [Lewis acid]/[Lewis base] = 0.5 to 1.0

| Entry | [$AlCl_3$] (M) | [i-$Pr_2O$] (M) | [$Bu_2O$] (M) | Conv.[a] (%) | Mn, NMR[b] (Dalton) | exo[b] (%) |
|---|---|---|---|---|---|---|
| 1. | 0.01 | 0.01 | — | 98 | 1300 | 56 |
| 2. | 0.01 | — | 0.01 | 28 | 2800 | 77 |
| 3. | 0.01 | 0.005 | 0.005 | 98 | 1500 | 78 |
| 4. | 0.01 | 0.0025 | 0.0075 | 97 | 1500 | 66 |
| 5. | 0.01 | 0.0075 | 0.0025 | 62 | 2100 | 79 |
| 6.[c] | 0.01 | 0.005 | 0.005 | 87 | 1700 | 76 |
| 7. | 0.01 | 0.001 | 0.009 | 30 | 2800 | 76 |
| 8. | 0.01 | 0.009 | 0.001 | 98 | 1400 | 58 |
| 9. | 0.01 | 0.006 | 0.006 | 98 | 1000 | 84 |
| 10. | 0.01 | 0.0075 | 0.0075 | 72 | 800 | 85 |

TABLE 1-continued

Polymerization of IB using [Lewis acid · Lewis base] =
0.005 to 0.01 M in dry hexanes at
0° C. with [Lewis acid]/[Lewis base] =
0.5 to 1.0

| Entry | [AlCl$_3$] (M) | [i-Pr$_2$O] (M) | [Bu$_2$O] (M) | Conv.[a] (%) | Mn, NMR[b] (Dalton) | exo[b] (%) |
|---|---|---|---|---|---|---|
| 11. | 0.01 | 0.01 | 0.01 | 14 | 3200 | 85 |
| 12. | 0.005 | 0.0025 | 0.0025 | 74 | 2600 | 77 |
| 13.[d] | 0.01 | 0.005 | 0.005 | 98 | 1400 | 77 |
| 14.[e] | 0.01 | 0.005 | 0.005 | 95 | 1500 | 79 |

[a]Determined gravimetrically (Macromolecules 2012, 45, 8598-8603) based on [IB]
[b]Determined by 1H NMR
[c]C4 feed was used for the polymerization
[d]Aromatic solvent, toluene was used for the polymerization
[e]Cyclic ether, tetrahydrofuran was used instead of Bu$_2$O for the polymerization The polymerization of IB in the presence of mixture of ethers (i-Pr$_2$O and Bu$_2$O, at particular ratio with respect to AlCl$_3$) afforded HR PIB with synergistic effect resulting in a high yield (98%) and with high exo content (85%) in comparison with these obtained with neat i-Pr$_2$O or Bu$_2$O (compare Entry 1 and 2 with Entry 3-13).

TABLE 2

Polymerization of IB using [Lewis acid · Lewis base] =
0.005 to 0.02 M in dry hexanes at
0° C. with [Lewis acid]/[Lewis base] = 0.5 to 1.0

| Entry | [AlCl$_3$] (M) | [EADC] (M) | [i-Pr$_2$O] (M) | [Bu$_2$O] (M) | Conv.[a] (%) | Mn, NMR[b] (Dalton) | exo[b] (%) |
|---|---|---|---|---|---|---|---|
| 1. | 0.01 | — | 0.01 | — | 98 | 1300 | 56 |
| 2. | — | 0.01 | 0.01 | — | 07 | 4200 | 82 |
| 3. | 0.005 | 0.005 | 0.01 | — | 98 | 1400 | 84 |
| 4. | 0.0025 | 0.0075 | 0.01 | — | 85 | 1800 | 80 |
| 5. | 0.0075 | 0.0025 | 0.01 | — | 98 | 1400 | 64 |
| 6.[c] | 0.005 | 0.005 | 0.01 | — | 86 | 1600 | 76 |
| 7. | 0.001 | 0.009 | 0.01 | — | 10 | 3800 | 83 |
| 8. | 0.009 | 0.001 | 0.01 | — | 98 | 1300 | 55 |
| 9. | 0.01 | 0.01 | 0.02 | — | 98 | 1000 | 81 |
| 10. | 0.0025 | 0.0025 | 0.005 | — | 70 | 2800 | 80 |
| 11. | 0.01 | — | — | 0.01 | 28 | 2800 | 77 |
| 12. | — | 0.01 | — | 0.01 | <5 | 4200 | 88 |
| 13. | 0.005 | 0.005 | — | 0.01 | 20 | 3400 | 82 |
| 14.[d] | 0.005 | 0.005 | 0.01 | — | 98 | 1300 | 83 |

[a]Determined gravimetrically (Macromolecules 2012, 45, 8598-8603) based on [IB]
[b]Determined by 1H NMR
[c]Catalyst was blended with low molecular weight HR PIB
[d]Aromatic solvent, xylene was used for the polymerization The polymerization of IB in the presence of mixture of Lewis acids (AlCl$_3$ and EADC, at particular ratio with respect to i-Pr$_2$O) afforded HR PIB with synergistic effect resulting in high yield (98%) and with high exo content (84%) in comparison with these obtained with neat AlCl$_3$ or EADC (compare Entry 1 and 2 with Entry 3-10).

TABLE 3

Polymerization of IB using [Lewis acid · Lewis base] =
0.01 M in dry hexanes at 0° C. with
[Lewis acid]/[Lewis base] = 1.0 and used different
polymerization quenchers

| Entry | [AlCl$_3$] (M) | [EADC] (M) | [iPr$_2$O] (M) | Conv.[a] Quencher | Mn, NMR[b] (Dalton) | exo[b] (%) |
|---|---|---|---|---|---|---|
| 1. | 0.005 | 0.005 | 0.01 | Methanol | 98 | 1300 | 83 |
| 2. | 0.005 | 0.005 | 0.01 | Water | 98 | 1400 | 82 |

TABLE 3-continued

Polymerization of IB using [Lewis acid · Lewis base] =
0.01 M in dry hexanes at 0° C. with
[Lewis acid]/[Lewis base] = 1.0 and used different
polymerization quenchers

| Entry | [AlCl$_3$] (M) | [EADC] (M) | [iPr$_2$O] (M) | Conv.[a] Quencher | Mn, NMR[b] (Dalton) | exo[b] (%) |
|---|---|---|---|---|---|---|
| 3. | 0.005 | 0.005 | 0.01 | Sodium hydroxide solution | 98 | 1400 | 83 |
| 4. | 0.005 | 0.005 | 0.01 | Ammonia solution | 98 | 1300 | 82 |

[a]Determined gravimetrically (Macromolecules 2012, 45, 8598-8603) based on [IB]
[b]Determined by 1H NMR The distribution of PIB end-groups was determined by 1H NMR spectroscopy (Macromolecules 2012, 45, 8598-8603). The olefinic region of the spectrum shown in FIGURE refers to two major characteristic signals at 4.64 and 4.85 ppm of the exo-olefin end groups. The small peaks of endo, tri (both the E and Z configurations), and tetra-substituted olefinic end groups are observed at 5.15, 5.37 and 5.17, and 2.84 ppm, respectively. Moreover, the methylene and methyl protons of the PIB main chain repeat units are observed at 1.42 and 1.11 ppm, respectively.

We claim:

1. A polymerization catalyst system for liquid phase polymerization of isobutylene or an isobutylene containing feed stock for producing highly reactive polyisobutylene, the catalyst system comprising:
   one or more Lewis acids,
   one or more Lewis bases, and
   optionally one or more initiators,
   wherein the catalyst system is a complex of a Lewis acid with a mixture of Lewis bases, wherein the mixture of Lewis bases comprises sterically hindered ether and linear dialkyl ether and
   wherein the polyisobutylene comprises homo or copolymers of isobutylene with at least 70 mole % of polymer chains in the polyisobutylene having exo olefin end groups.

2. The polymerization catalyst system as claimed in claim 1, wherein the Lewis acid is $$MR_mX_n \quad \text{(Formula I)}$$

wherein
M is selected from the group consisting of Al, Ga, Zr, W, Fe, and Hf,
R is an alkyl group having 1 to 12 carbon atoms,
X is a halogen, wherein X is selected from F, Cl, and Br,
m is in the range of 0 to 5,
n is an integer in the range of 1 to 6, and
wherein m+n is equal to the valency of M;
wherein the catalyst system comprises one Lewis acid of Formula I.

3. The polymerization catalyst system as claimed in claim 2, wherein M is Al, Ga, or Fe, X is Cl or Br, R is an alkyl group having 1 to 8 carbon atoms, m ranges from 0 to 3, and n ranges from 1 to 4.

4. The polymerization catalyst system as claimed in claim 3, wherein M is Al, and the Lewis acid is selected from AlX$_3$, alkyl AlX$_2$, or a mixture of AlX$_3$ and alkyl AlX$_2$, wherein X is Cl or Br, and the alkyl group has 1 to 8 carbon atoms.

5. The polymerization catalyst system as claimed in claim 4, wherein X is Cl, and wherein the Lewis acid is selected from $AlCl_3$, or ethyl aluminum dichloride, or a mixture of $AlCl_3$ and or ethyl aluminum dichloride.

6. The polymerization catalyst system as claimed in claim 1, wherein the ether is selected from the group consisting of methyl ether, ethyl ether, n-propyl ether, n-butyl ether, n-pentyl ether, n-hexyl ether, n-heptyl ether, n-octyl ether, sec-butyl ether, isopropyl ether, isobutyl ether, (2-ethylhexyl) ether, methyl n-butyl ether, methyl sec-butyl ether, methyl n-hexyl ether, methyl n-octyl ether, ethyl n-hexyl ether, ethyl n-octyl ether, ethyl 2-ethylhexyl ether, n-butyl n-octyl ether, n-butyl 2-ethylhexyl ether, ethyl n-butyl ether, ethyl sec-butyl ether, ethyl isobutyl ether, n-propyl-n-butyl ether, n-propyl sec-butyl ether, n-propyl isobutyl ether, n-propyl tert-butyl ether, isopropyl n-butyl ether, methyl isobutyl ether, methyl tert-butyl ether, isopropyl sec-butyl ether, isopropyl isobutyl ether, iso propyl tert-butyl ether, dicyclohexyl ether, diisopropyl ether, dibutyl ether, diphenyl ether, ditolyl ether, dibenzyl ether, tetrahydrofuran, tetrahydropyran, 1,2-dioxane, 1,3-dioxane and 1,4-dioxane.

7. The polymerization catalyst system as claimed in claim 1, wherein the lexis acid is $AlCl_3$ and wherein during polymerization reaction the catalyst is present in an amount ranging from 0.005 to 0.01 M.

8. The polymerization catalyst system as claimed in claim 7, wherein mole ratio of the sterically hindered ether, linear dialkyl ether, and $AlCl_3$ is in the range of 0.25-0.75:0.25-0.75:0.5-1.

9. The polymerization catalyst system as claimed in claim 7, wherein the sterically hindered ether is diisopropyl ether and the linear dialkyl ether is dibutyl ether.

10. The polymerization catalyst system as claimed in claim 1, wherein the catalyst comprises
a Lewis acid selected from $AlCl_3$, and ethyl aluminum dichloride (EADC),
a Lewis base mixture.

11. The polymerization catalyst system as claimed in claim 10, wherein the Lewis base mixture is a mixture of sterically hindered ether and linear dialkyl ether.

12. The polymerization catalyst system as claimed in claim 10, wherein molar ratio of $AlCl_3$, ethylaluminum dichloride (EADC) and the Lewis base mixture is in the range of 0.25-0.75:0.25-0.75:0.5-1.5.

13. The polymerization catalyst system as claimed in claim 1, wherein the initiator is selected from hydrochloric acid, water, and a compound of the formula ROH or RX, wherein R is a hydrocarbyl group.

14. The polymerization catalyst system as claimed in claim 13, wherein the initiator is selected from tert-butyl chloride and adventitious moisture.

15. A process for preparing highly reactive polyisobutylene by liquid phase polymerization of isobutylene or an isobutylene containing feed stock using the polymerization catalyst system as claimed in claim 1, the process comprising:
a) adding a non-polar solvent at a temperature ranging from −20° C. to 25° C. in a jacketed polymerization reactor equipped with a condenser operating at a temperature ranging from −20 to 10° C. under nitrogen atmosphere, wherein the non-polar solvent is selected from C4 feed, pentanes, hexanes, heptanes, octanes, decanes, paraffins, toluene, and xylenes,
b) adding isobutylene or an isobutylene containing feed stock to the polymerization reactor containing the non-polar solvent,
c) adding the polymerization catalyst system at a temperature ranging from −20° C. to 20° C. to the polymerization reactor, and
d) terminating polymerization reaction after 1 hour by addition of a polymerization quencher and obtaining the highly reactive polyisobutylene, wherein the polymerization quencher is selected from alcohols, amines, caustics, and water,
wherein polymer chains in the polyisobutylene comprises exo olefin end groups in an amount of greater than 70 mole % and number average molecular weight of the polyisobutylene ranges from 500 to 5000 Dalton.

16. The process as claimed in claim 15, wherein the polymerization quencher is selected from methanol, water, sodium hydroxide solution, and ammonia solution.

* * * * *